United States Patent
Eisele et al.

(10) Patent No.: US 10,427,677 B2
(45) Date of Patent: Oct. 1, 2019

(54) OBJECT TRACKING PRIOR TO AND DURING A COLLISION

(71) Applicant: Robert Bosch GmbH, Stuttgart (DE)

(72) Inventors: Sybille Eisele, Hessigheim (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 15/555,141

(22) PCT Filed: Mar. 8, 2016

(86) PCT No.: PCT/EP2016/054882
§ 371 (c)(1),
(2) Date: Sep. 1, 2017

(87) PCT Pub. No.: WO2016/165880
PCT Pub. Date: Oct. 20, 2016

(65) Prior Publication Data
US 2018/0043889 A1 Feb. 15, 2018

(30) Foreign Application Priority Data
Apr. 17, 2015 (DE) .................. 10 2015 207 016

(51) Int. Cl.
*B60W 30/095* (2012.01)
*B60W 30/08* (2012.01)
(Continued)

(52) U.S. Cl.
CPC ........ *B60W 30/0956* (2013.01); *B60W 30/08* (2013.01); *G08G 1/166* (2013.01);
(Continued)

(58) Field of Classification Search
CPC .......... G08G 1/166; G08G 1/167; G08G 1/16; G08G 1/164; G08G 1/205; G08G 1/04;
(Continued)

(56) References Cited

U.S. PATENT DOCUMENTS

2005/0209756 A1* 9/2005 Ueno .................. B60R 21/0132
701/45
2007/0052530 A1* 3/2007 Diebold ................ B60R 21/013
340/467
(Continued)

FOREIGN PATENT DOCUMENTS

| DE | 102011087781 A1 | 6/2013 |
| DE | 102012107186 A1 | 2/2014 |

(Continued)

OTHER PUBLICATIONS

International Search Report dated May 19, 2016, of the corresponding International Application PCT/EP2016/054882 filed Mar. 8, 2016.

*Primary Examiner* — Mahmoud S Ismail
*Assistant Examiner* — Bakari Underwood
(74) *Attorney, Agent, or Firm* — Norton Rose Fulbright US LLP; Gerard Messina

(57) ABSTRACT

A method includes steps of detecting an object in an environment of a motor vehicle; in a first phase, tracking the object with respect to the motor vehicle with the aid of a first movement model of the motor vehicle; detecting a collision of the motor vehicle with an obstacle; and in a second phase, tracking the object with respect to the motor vehicle with the aid of a second movement model of the motor vehicle.

15 Claims, 3 Drawing Sheets

(51) Int. Cl.
   *G08G 1/16*    (2006.01)
   *B60W 50/00*   (2006.01)
   *B60W 50/02*   (2012.01)

(52) U.S. Cl.
   CPC .................. *B60W 2030/082* (2013.01); *B60W 2050/0062* (2013.01); *B60W 2050/0215* (2013.01); *B60W 2550/10* (2013.01)

(58) Field of Classification Search
   CPC .......... G08G 1/965; G08G 1/02; G08G 1/048; G08G 1/096741; G08G 1/207; B60W 30/09; B60W 30/10; B60W 30/0956; B60W 30/42; B60W 30/12; B60W 30/0089; B60W 30/0292; B60W 30/0205; B60W 30/045; G05D 1/0088; G05D 1/0214; G05D 1/0212; G05D 1/0246; G05D 1/0289; G06K 9/00791; G06K 9/00805; G06K 9/4633; G01S 13/931; G01S 13/936; G01S 13/026; G01S 13/93; G01S 13/50; G01S 13/88; B60R 21/0132; B60R 21/8093; B60R 21/0134; B60R 21/022; B60R 21/20; Y02D 70/1262; Y02D 70/1264; Y02D 70/142; Y02D 70/144; Y02D 70/162; Y02D 70/164; Y02D 70/166; Y02D 70/21; Y02D 70/24; Y02D 70/25

See application file for complete search history.

(56)    References Cited

U.S. PATENT DOCUMENTS

2008/0291078 A1*  11/2008  Hilsebecher ........ B60R 21/0134
                                                          342/70
   2014/0012492 A1*  1/2014   Bowers .................... G08G 1/16
                                                          701/301

FOREIGN PATENT DOCUMENTS

DE    102014008350 A1    11/2014
   DE    102013211651 A1    12/2014
   DE    102013215472 A1    2/2015
   EP         2572953 A1    3/2013
   JP         2002178904 A  6/2002
   JP         2015047980 A  3/2015
   WO         2006106009 A1 10/2006

* cited by examiner

OBJECT TRACKING PRIOR TO AND DURING A COLLISION

FIELD

The present invention relates to an environment detection system and to a crash detection system in a vehicle.

BACKGROUND INFORMATION

A vehicle is equipped with a driver assistance system or an automatic control that assists a driver in controlling the motor vehicle. Specifically, assistance in a longitudinal and a lateral control of the motor vehicle is rendered in this context, either individually or jointly. For the control, an environment of the motor vehicle is scanned, e.g., optically and/or by radar, and objects and the characteristic of their relative movements in the surrounding area of the motor vehicle, i.e., their trajectories, are ascertained from the scanned information. This process is also known as tracking. In order to allow for a reliable ascertainment of the trajectories, the information is usually determined at fixed time intervals and plausibilized with the aid of a movement model. The movement model of the motor vehicle is based on assumptions, e.g., a maximum acceleration or a maximum yaw rate that are expected during a normal operation of the motor vehicle.

If the motor vehicle is involved in an accident, especially a collision, then the driver assistance system is usually switched off immediately. The accelerations that occur during a collision frequently exceed the accelerations provided for in the movement model many times over so that the plausibilization of the trajectories during the accident is not successful. To allow a reliable resumption of tracking after the accident, scanning of the environment of the motor vehicle must usually be carried out in a plurality of scanning steps. Generally, a plausibilization normally requires data that were collected over a period of multiple seconds or even multiple minutes. The determination of the trajectories may therefore be carried out only poorly or not at all after the accident has ended.

The present invention may provide improved technique for detecting the environment of a motor vehicle in the event of a first collision. Preferred example embodiments are described herein.

SUMMARY

An example method in accordance with the present invention includes steps of detecting an object in an environment of a motor vehicle; of tracking the object with respect to the motor vehicle in a first phase with the aid of a first movement model of the motor vehicle; of detecting a collision of the motor vehicle with an obstacle; and of tracking the object with respect to the vehicle in a second phase with the aid of a second movement model of the motor vehicle.

Using a different movement model during the collision allows for the continued use of detection data of the object for tracking the object with respect to the motor vehicle. In this way the relative movement between the object and the motor vehicle can thus be determined even in the event of an accident. As a rule, the movement models differ by maximum speed and acceleration values and/or maximum yaw rates of the motor vehicle. The second movement model, for example, may allow for considerably higher acceleration values than the first movement model.

In the second phase, the object is preferably also tracked on the basis of detection data of the object in the first phase. The tracking of the object or its trajectory with respect to the motor vehicle may in particular be plausibilized on the basis of detection data from both phases. The object or its trajectory may thereby be tracked in a more reliable manner or without gaps.

In another specific embodiment, the end of the collision is also determined, and in a third phase, the object or its trajectory continues to be tracked with respect to the motor vehicle with the aid of the first movement model of the motor vehicle. The switchover to the usual processing following the end of the collision makes it possible to better plausibilize the detection data of the object. The object can therefore be tracked in a better or more precise manner.

It is preferred, in particular, that in the third phase the object is tracked also on the basis of detection data of the object in the second phase. In addition or as an alternative to the detection data of the object in the second phase, it is possible to use detection data of the object in the first phase.

Endeavored is the most uninterrupted use of temporally intermittent detection data of the objects in multiple phases. The plausibilization of the detection data, and thus the tracking of the object or the characteristic of its relative movement with respect to the motor vehicle, are able to be carried out in a more optimal manner as a result.

It is furthermore preferred that a movement of the motor vehicle in the third phase is controlled on the basis of the tracked object. In particular, the movement of the motor vehicle is able to be controlled in such a way that the motor vehicle leaves a danger zone that obtains in the area of the collision. Additional controls may also be implemented. For example, it is able to be determined whether another collision is looming, and measures may be taken to avoid the second collision or to mitigate its consequences. For instance, an active or a passive safety system for passengers of the motor vehicle may be reactivated.

It is possible to determine the direction from which the obstacle collides with the motor vehicle, the object in the second phase being tracked only on the basis of sensor data whose allocated sensors are facing away from the direction of the collision. The second phase is normally too short to carry out a plausibilization of sensor or detection data. By dispensing with sensor data from sensors whose functioning has most likely been affected by the collision, it is nevertheless possible to carry out improved tracking of the object during the second phase.

In one specific embodiment, the collision is determined on the basis of data from an acceleration sensor. The acceleration sensor may be mounted on the vehicle in a centralized or decentralized manner. It is also possible to use a plurality of acceleration sensors.

In one variant, an acceleration caused by the collision as well as an acceleration direction are taken into account in the tracking of the object in the second phase. In this way the tracking of the object or its trajectory can also be carried out during the collision under conditions that are difficult from the aspect of measuring and processing technology.

In another specific embodiment, data from an upfront sensor are taken into account in the tracking of the object in the second phase. Upfront sensors are usually mounted at the front of the motor vehicle in the driving direction and, for instance, may be used for ascertaining the characteristic and the severity of a front impact at an early point in time. In addition, a plurality of upfront sensors allow for the detection of a partially overlapping head-on accident. When partially overlapping head-on accidents are detected, one or a plurality of environmental sensors in the area of the affected partial overlap is/are no longer able to be analyzed in the second and third phase.

In addition, data from a peripheral sensor, a roll rate sensor or a yaw rate sensor may be incorporated into the tracking of the object in the second phase. This makes it possible to use characteristic data that allow the further tracking of the movement of the object to be carried out in a more optimal manner.

A computer program product includes program code for executing the described method when the computer program product is running on a processing unit or is stored on a computer-readable data carrier.

BRIEF DESCRIPTION OF THE DRAWINGS

The present invention is described in greater detail below with reference to the figures.

DETAILED DESCRIPTION OF EXAMPLE EMBODIMENTS

Figure 1:
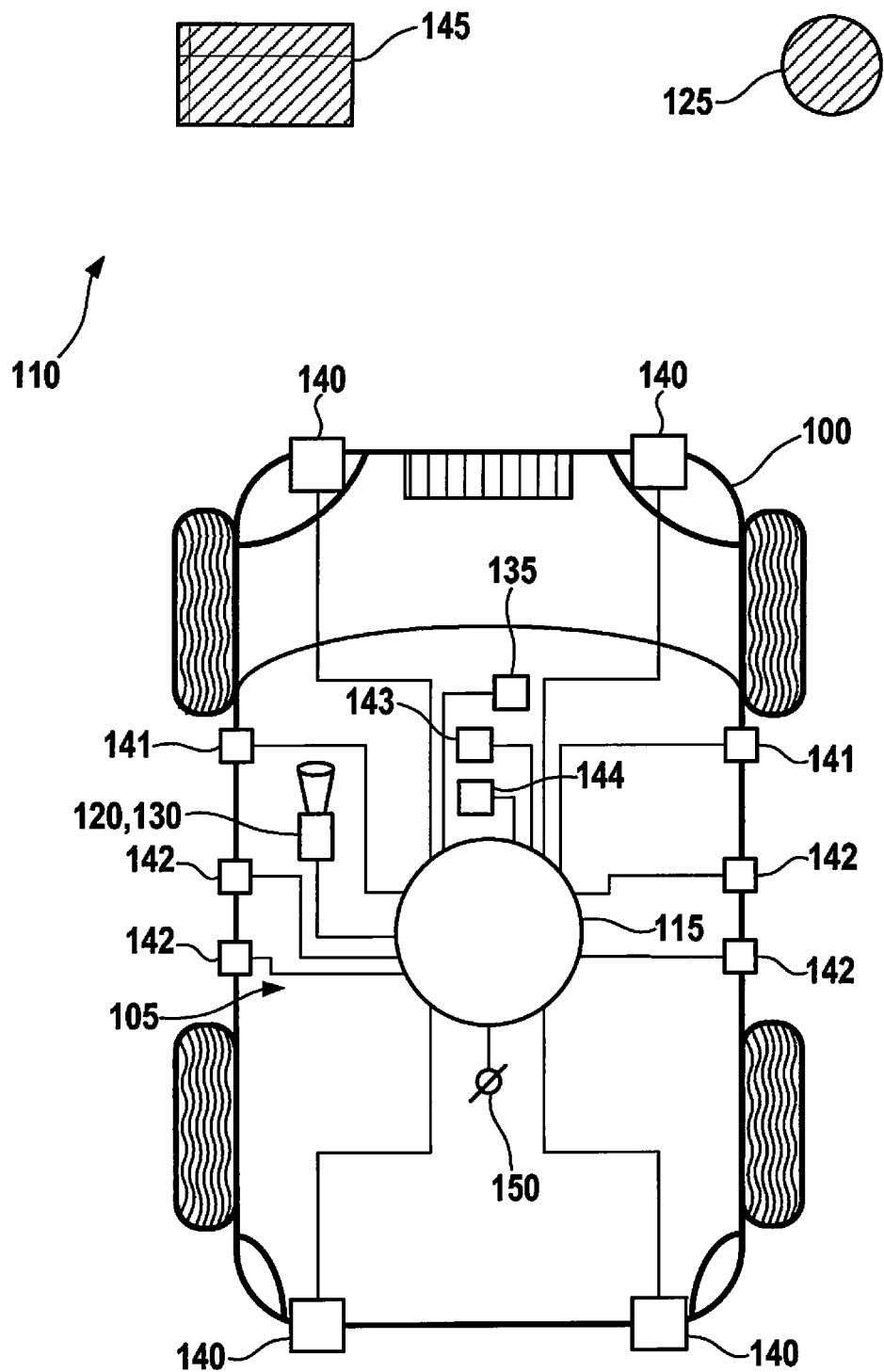
FIG. 1 shows a device on board of a motor vehicle.

FIG. 1 shows a motor vehicle 100 having a device 105. Device 105 realizes a driver assistance system or an automatic vehicle control; device 105 may include components that are also allocated to some other system on board of motor vehicle 105, such as a parking or navigation system. More specifically, device 105 is designed to determine an object or the characteristic of its relative movement in an environment with respect to the motor vehicle.

Device 105 includes a processing unit 115, which is equipped with at least one sensor 120 for scanning an object 125 in environment 110 of motor vehicle 100. Object 125 may be an object that is stationary in relation to an environment, e.g. a road pole, or it may involve a mobile or a moving object, such as another motor vehicle or a pedestrian. Although multiple objects 125 are usually detected, the introduced technology will be described predominantly with reference to only a single exemplary object 125 in the following text.

A plurality of sensors 120 may be used, which are able to scan different regions of environment 110 and/or which may have different designs. For example, one or more camera or radar sensor(s) 130 may be provided for scanning object 125. These sensors 120 are able to be mounted in a central location of motor vehicle 100 or in the region of a periphery of motor vehicle 100.

Still further sensors may be provided for the further determination of the movement behavior of motor vehicle 100. An inertial sensor that determines an acceleration in one or a plurality of direction(s) in space, or a rate-of rotation sensor for one or more direction(s) of space may be among them for this purpose. For the second phase, crash sensor data may be employed for determining the crash movement model.

To determine the instant of the collision or the crash direction, a central acceleration sensor 135 and/or one or more upfront sensor(s) 140 and/or one or more peripheral sensor(s) 141, 142, for example, may be used. If at least two upfront sensors 140 are installed in a vehicle, e.g. on the front or the rear of motor vehicle 100, then partial overlapping of motor vehicle 100 with object 125 during the collision is able to be detected. A side collision may be detected with the aid of one or more peripheral sensor(s) and/or a central acceleration sensor. As far as the peripheral sensors are concerned, a pressure sensor 141, perhaps installed in a vehicle door, and/or an acceleration sensor, which may be installed in a door sill or in a B-pillar and/or in a C-pillar, for instance, may be analyzed. A vehicle rollover is able to be detected by an additional evaluation of a roll rate sensor 143 for determining a rate of rotation about the longitudinal axis of motor vehicle 100 (roll angle rate). It is also possible to provide a yaw rate sensor 144 in order to determine a rate-of-rotation of vehicle 100 about the vertical axis (yaw rate). Acceleration sensor 135, roll rate sensor 143, and/or yaw rate sensor 144 preferably lie(s) on a longitudinal axis of motor vehicle 100. A plurality of sensors 130-144 may also be developed in integrated form with one another, e.g., in the form of a multi-channel acceleration sensor.

In one specific embodiment, processing unit 115 is designed to provide movement information about object 125 at an interface 150. A driver assistance system or an automatic vehicle control are able to use data for the continued control of motor vehicle 100, e.g., by activating a safety system or also by controlling the movement of motor vehicle 100. In particular following the collision of motor vehicle 100 with an obstacle 145, motor vehicle 100 may be actuated to leave a danger zone in environment 110, this danger zone possibly including object 125. In another specific embodiment, an attempt to reach a safety zone that encompasses a hard shoulder or brake-down lane of a road may be made. A longitudinal or lateral control of motor vehicle 100 may be actively influenced toward this end. This makes it possible to avoid a secondary accident involving motor vehicle 100.

Sensors 120 are usually sampled multiple times within a predefined time interval so that temporally coordinated measurements are available. These measurements are plausibilized with regard to a movement model of motor vehicle 100. This movement model may in particular include maximum speed or acceleration values for motor vehicle 100. Samplings that point to an acceleration of motor vehicle 100 with respect to object 125 that exceeds the limits of the movement model, for instance, may be discarded. It is proposed to determine a collision between motor vehicle 100 and obstacle 145 and to use a modified movement model for analyzing the sensor data from sensors 120 during the collision. The relative movement of motor vehicle 100 with respect to object 125 can thus be accurately determined even during the collision and, in particular, be determined with the aid of sensor values prior to the collision.

In advance of the collision, obstacle 145 may likewise be considered an object 125 and its movement in relation to motor vehicle 100 be tracked. In one specific embodiment, the tracking of obstacle 145 as object 125 may also be continued following the collision. In another specific embodiment, on the other hand, obstacle 145 is no longer considered as object 125 and tracked following the collision.

FIG. 2 shows phases of a collision of motor vehicle 100 from FIG. 1 with obstacle 145. A head-on collision is shown by way of example although the technology introduced here may also be used for any other type of collision, such as a rear-end collision, an offset collision or a side impact, for example.

Figure 2A:
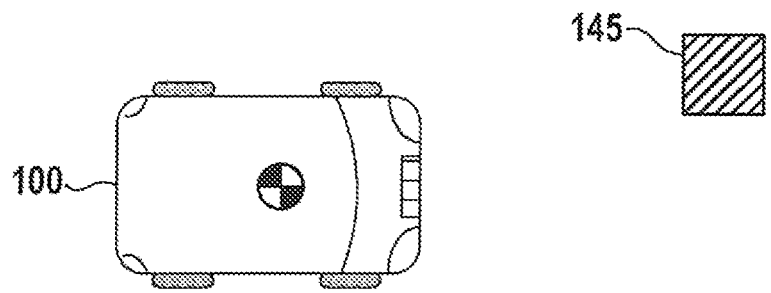
FIG. 2 shows phases of a collision of the motor vehicle from FIG. 1 with an object.

FIG. 2a shows a first phase, during which motor vehicle 100 is moving with respect to obstacle 145 in the normal operation. During this first phase, the movement of motor vehicle 100 is able to be determined with the aid of a first movement model, as described in detail in the previous text.

Figure 2B:
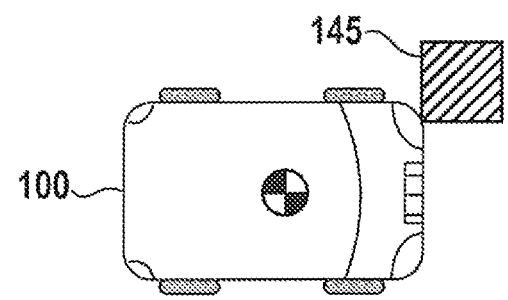

FIG. 2b shows the transition from the first to a second phase, during which motor vehicle 100 collides with obstacle 145. During the second phase, for instance, acceleration values, e.g., in the longitudinal or transverse direction or in the vertical direction, or rates of rotation about a longitudinal or vertical axis of motor vehicle 100, may exceed the limits of the first movement model. For example, such acceleration values or rates of rotation may occur during a collision, during skidding, a rollover or some other consequence of an accident.

Figure 2C:
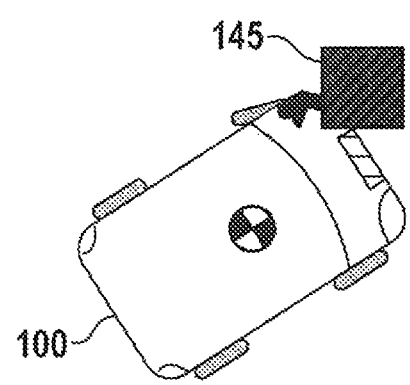

FIG. 2c shows motor vehicle 100 in the second phase during the collision with obstacle 145. In the selected example, the forward-driving speed of motor vehicle 100 is reduced rapidly, and vehicle 100 is heavily accelerated about the vertical axis at the same time. During the second phase it is preferred to determine the movement of motor vehicle 100 with reference to a second movement model that specifically allows acceleration values of motor vehicle 100 as they may occur during a maneuver of this type.

Figure 2D:
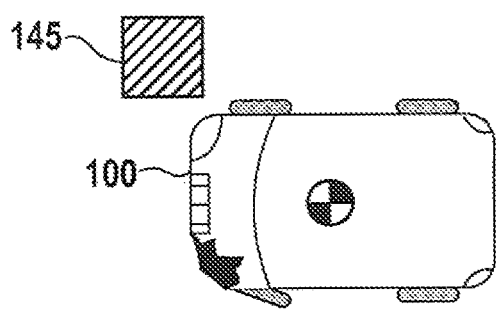

FIG. 2d shows motor vehicle 100 in a third phase that may follow the second phase. The collision with obstacle 145 has been concluded, and the movement determination is once again able to be carried out on the basis of the first movement model.

In so doing, a control of motor vehicle 100 may be implemented, especially in order to transfer the vehicle into a safe position or to a safe location. The control may be realized with the aid of a driving assistant or an automatic vehicle control.

Figure 3:
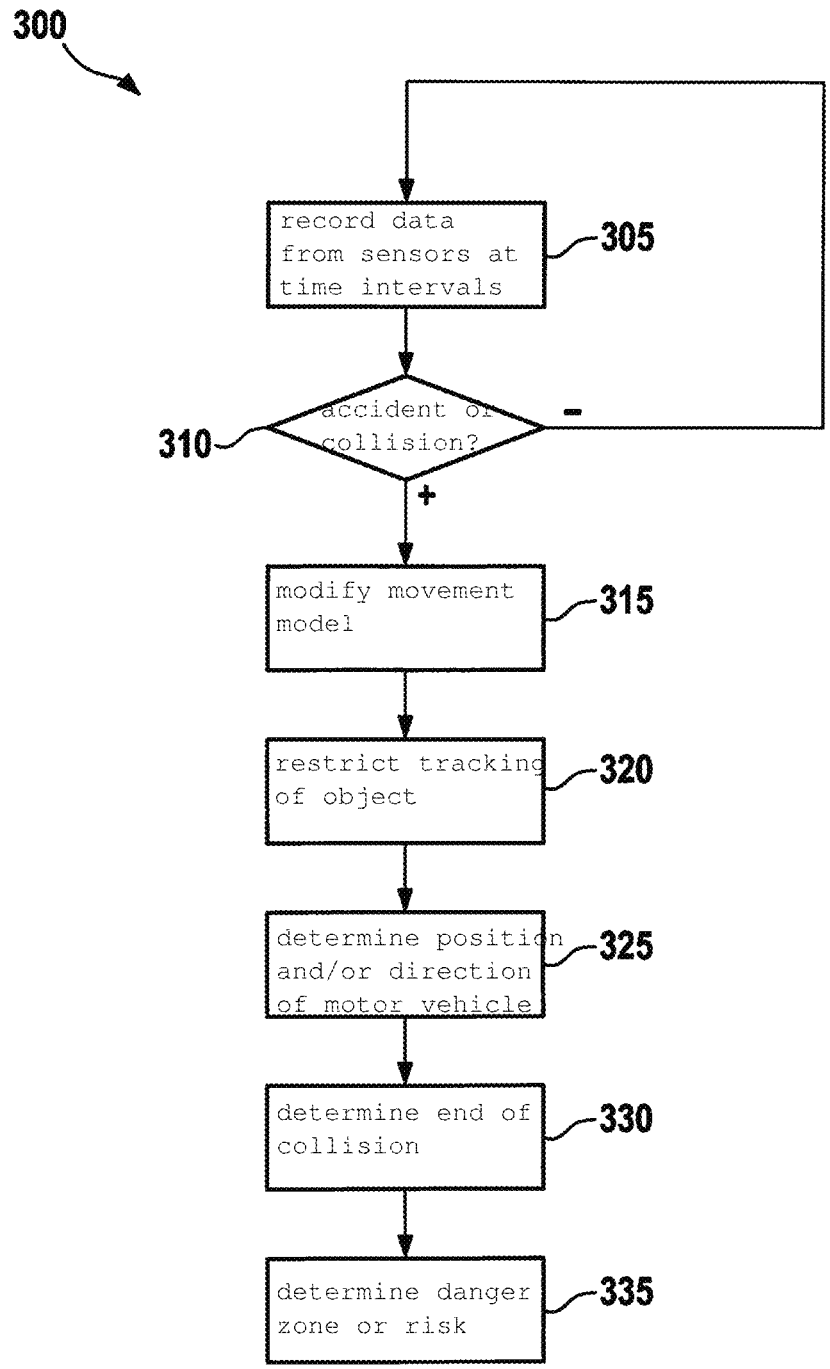
FIG. 3 shows a flow diagram of a method for controlling the motor vehicle from FIG. 1.

FIG. 3 shows a flow diagram of a method 300 for controlling motor vehicle 100 from FIG. 1. In a first step 305, data from sensors 120 are recorded at time intervals. Obstacle 145 is tracked with regard to its movement in relation to motor vehicle 100, such tracking being carried out on the basis of the first movement model of motor vehicle 100. The determined movement may be made available to a driver assistance system or to an automatic vehicle control that carries out a longitudinal or lateral control of motor vehicle 100, in particular. The driver assistance system or the automatic vehicle control may be integrated into processing unit 115 from FIG. 1, for instance.

In a step 310, it is determined whether an accident or a collision of motor vehicle 100 with obstacle 145 has resulted. This determination may be made especially on the basis of sensors 135 and/or 140 and/or 141 and/or 142 and/or 143. In a refinement, the severity of the collision is able to be determined in order to derive therefrom whether motor vehicle 100 is still able to move or able to be controlled after the collision has ended. If no collision was determined, then method 300 may return to step 305 and be run through again.

In the other case, the movement model that forms the basis of the tracking of obstacle 145 with respect of motor vehicle 100 is modified in a step 315. The movement model or the movement between vehicle 100 and obstacle 145 may be determined in particular on the basis of a direction from which obstacle 145 is acting on motor vehicle 100, and from a deceleration of motor vehicle 100. In addition, it is also possible to evaluate rate-of-rotation signals in addition to the crash-acceleration values.

In a step 320, the tracking of object 125 is able to be restricted to sensor data from the particular sensors 120 that are facing away from the direction of the impact of obstacle 145 on motor vehicle 100. In practice, a plurality of objects 125 is usually present, of which then only those objects that face away from the direction of the impact can continue to be tracked further. In this way it can be avoided that signals from a sensor 140 are used for the plausibilization or tracking whose allocated sensor 140 has been adversely affected by the collision. In addition, it can thereby be avoided that obstacle 145, which may execute a movement on account of the collision that is difficult to determine, continues to be tracked as object 125.

In a step 325, in particular a position and/or a direction of motor vehicle 100 following the collision with obstacle 145 may be determined. It is not necessary to plausibilize the tracking of object 125 on the basis of the data from sensors 120 across a plurality of measuring cycles for this purpose.

In a step 330, the end of the collision is able to be determined, in particular on the basis of acceleration data such as from acceleration sensor 135, and/or upfront sensors 140, and/or peripheral sensors 141, 142, and/or roll rate sensor 143, for example. The first movement model may be reactivated again following the end of the collision in order to continue to determine the tracking between motor vehicle 100 and object 125.

In a step 335, it is able to be determined whether vehicle 100 is located in a danger zone or whether there is a risk of a secondary collision. In such a case, motor vehicle 100 may be controlled to assume a safe position in environment 110. Functions of the aforementioned driver assistance systems and/or the automatic vehicle control may be used for this purpose.

What is claimed is:

1. A method comprising: detecting an object in an environment of a motor vehicle;
   in a first phase:
   a processor tracking the object relative to the motor vehicle based on sensor data obtained from at least one sensor and using a first movement model of the motor vehicle; and
   the processor controlling movements of the motor vehicle based on the tracking of the first phase;
   detecting a collision of the motor vehicle with an obstacle;
   the processor determining from which direction the obstacle collides with the motor vehicle in the detected collision; and
   in a second phase:
   the processor tracking the object relative to the motor vehicle based on sensor data obtained from only that of the at least one sensor which faces away from the determined direction of the collision and using a second movement model of the motor vehicle; and
   the processor controlling the movements of the motor vehicle based on the tracking of the second phase.

2. The method as recited in claim 1, wherein in the second phase, the object is also tracked on the basis of data of the detection of the object in the first phase.

3. The method as recited in claim 1, wherein an end of the collision is determined, and in a third phase, the object continues to be tracked with respect to the vehicle using the first movement model of the motor vehicle.

4. The method as recited in claim 3, wherein in the third phase, the object is also tracked on the basis of data of the detection of the object in the second phase.

5. The method as recited in claim 3, wherein, in the third phase, a movement of the motor vehicle is controlled on the basis of the tracked object.

6. The method as recited in claim 1, wherein the detection of the collision is on the basis of data from an acceleration sensor.

7. The method as recited in claim 6, wherein an acceleration caused by the collision, and an acceleration direction are taken into account in the tracking of the object in the second phase.

8. The method as recited in claim 1, wherein data from an upfront sensor are taken into account in the tracking of the object in the second phase.

9. The method as recited in claim 1, wherein data from a peripheral sensor are taken into account in the tracking of the object in the second phase.

10. The method as recited in claim 1, wherein data from a roll rate sensor are taken into account in the tracking of the object in the second phase.

11. The method as recited in claim 1, wherein data from a yaw rate sensor are taken into account in the tracking of the object in the second phase.

12. The method as recited in claim 1, wherein each of the first and second movement models identifies different respective extremums beyond which values of the sensor data are to be disregarded for the tracking.

13. The method as recited in claim 1, wherein:
the sensor data obtained in the first phase is interpreted by the processor according to the first movement model;
the tracking of the first phase is performed by the processor based on the interpretation;
responsive to the detection of the collision, the sensor data obtained in the second phase is interpreted by the processor according to the second movement model instead of the first movement model; and
the tracking of the second phase is performed based on the interpretation of the sensor obtained in the second phase.

14. A non-transitory computer readable storage medium on which is stored program code that is executable by a processor and that, when executed by the processor, causes the processor to perform a method, the method comprising:
detecting an object in an environment of a motor vehicle;
in a first phase:
tracking the object relative to the motor vehicle based on sensor data obtained from at least one sensor and using a first movement model of the motor vehicle; and
controlling movements of the motor vehicle based on the tracking of the first phase;
detecting a collision of the motor vehicle with an obstacle;
determining from which direction the obstacle collides with the motor vehicle in the detected collision; and
in a second phase:
tracking the object relative to the motor vehicle based on sensor data obtained from only that of the at least one sensor which faces away from the determined direction of the collision and using a second movement model of the motor vehicle; and
controlling the movements of the motor vehicle based on the tracking of the second phase.

15. The non-transitory computer readable storage medium as recited in claim 14, wherein:
the sensor data obtained in the first phase is interpreted according to the first movement model;
the tracking of the first phase is performed based on the interpretation;
responsive to the detection of the collision, the sensor data obtained in the second phase is interpreted according to the second movement model instead of the first movement model; and
the tracking of the second phase is performed based on the interpretation of the sensor obtained in the second phase.

* * * * *